United States Patent [19]

Des Roches

[11] 4,224,855

[45] Sep. 30, 1980

[54] POWER SAW GUIDING APPARATUS

[76] Inventor: Emile A. Des Roches, 6936 Jubilee Ave., Burnaby, British Columbia, Canada, V5J 4B3

[21] Appl. No.: 31,893

[22] Filed: Apr. 20, 1979

[51] Int. Cl.³ ............................................... B27B 9/04
[52] U.S. Cl. ........................................ 83/745; 83/574; 83/471.2; 83/486; 83/455
[58] Field of Search .............. 83/745, 574, 486, 486.1, 83/471.2, 471.3, 581, 455, 454

[56] References Cited

U.S. PATENT DOCUMENTS

| | | | |
|---|---|---|---|
| 2,677,399 | 5/1954 | Getsinger | 83/574 |
| 2,735,455 | 2/1956 | Forsberg | 83/745 |
| 2,942,633 | 6/1960 | King | 83/745 |
| 3,869,951 | 3/1975 | Litwin | 83/745 |
| 4,077,292 | 3/1978 | Cole | 83/745 |
| 4,125,942 | 11/1978 | Horner et al. | 83/745 |

*Primary Examiner*—Donald R. Schran

*Attorney, Agent, or Firm*—Townsend and Townsend

[57] ABSTRACT

Apparatus for guiding a power saw has a guide bar provided with side and end edges. Saw-guiding members near each side edge of the guide bar are parallel to the longitudinal axis of the bar and extend between opposite ends of the bar. There is a longitudinal slot at one end of the bar midway between the saw-guiding members and a cross bar at the opposite end. A clamp may be used to releasably attach the cross bar end of the guide bar to the workpiece while the opposite end is secured by a pivot member entered into the workpiece through the longitudinal slot. The power saw is fitted with a slide connector capable of slidably engaging either one of the saw-guiding members. The arrangement is such that a lengthly workpiece can be cut more than halfway through starting from one end edge whereupon the guide bar can be swung about the pivot to the opposite end edge which allows the cut to be completed with speed and accuracy.

6 Claims, 6 Drawing Figures

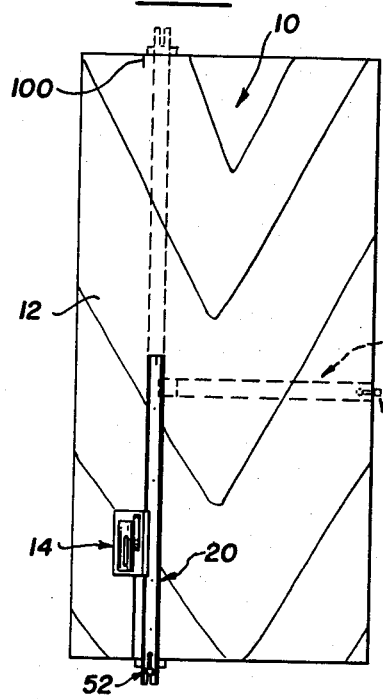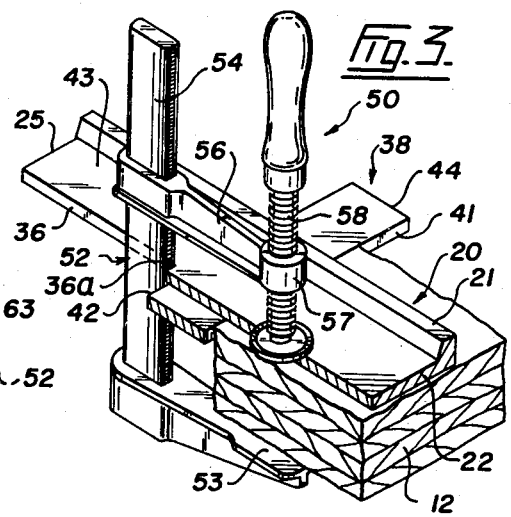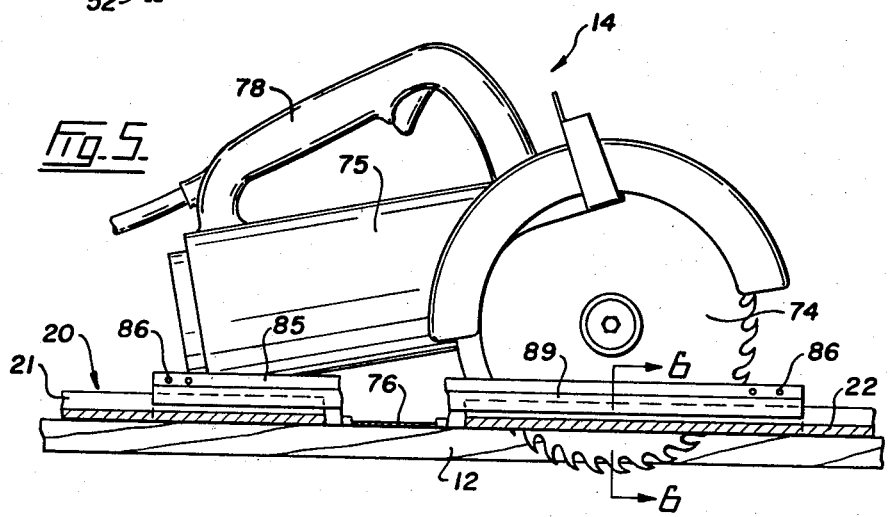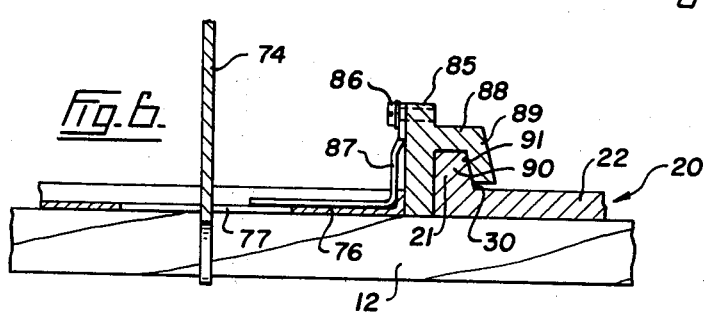

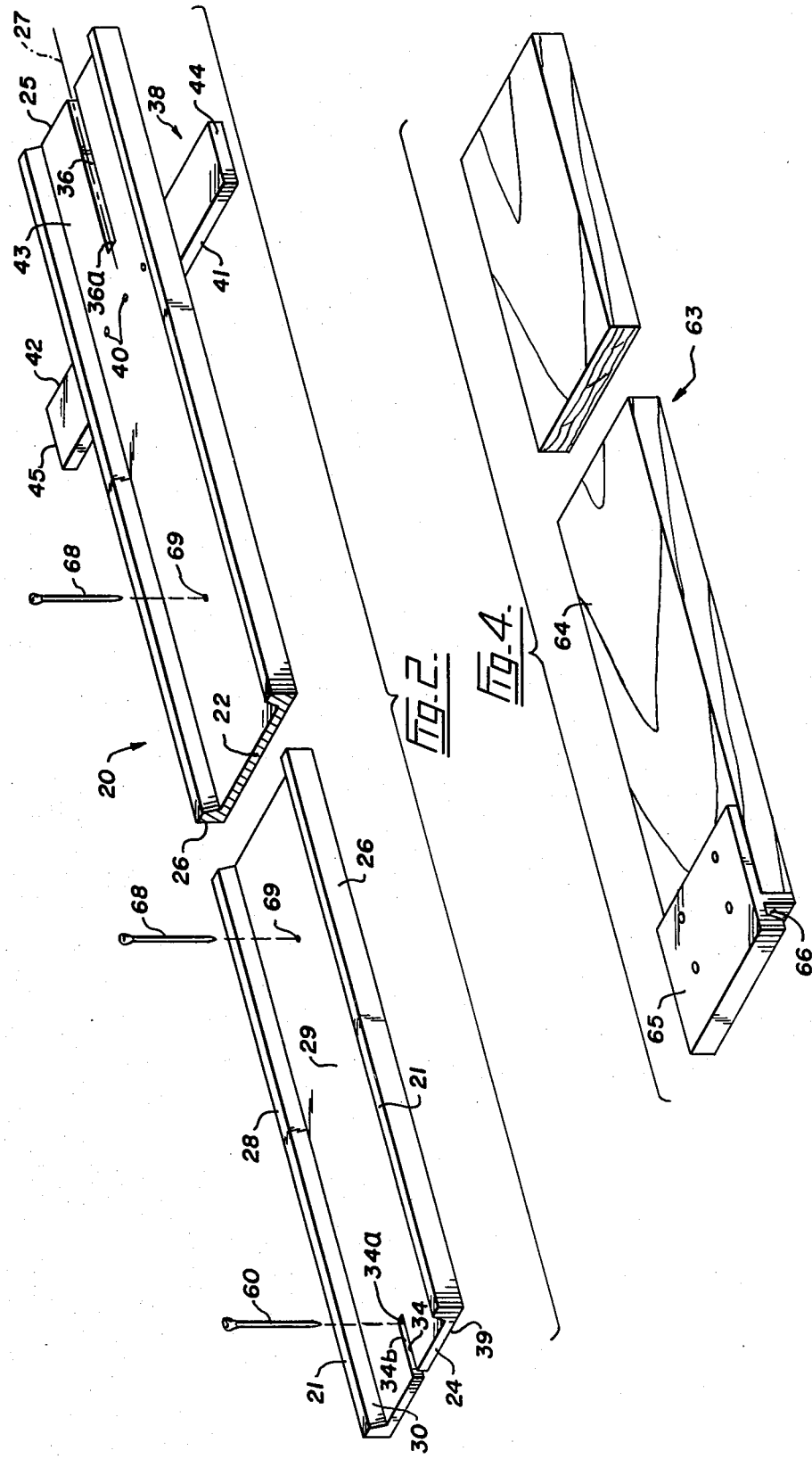

POWER SAW GUIDING APPARATUS

BACKGROUND OF THE INVENTION

This invention relates to guides for power saws and more particularly to guiding apparatus for a saw used to cut sheet material.

The most pertinent prior art known to applicant comprises U.S. patents: U.S. Pat. No. 2,708,465 issued May 17, 1955 to F. C. Huebner et al; U.S. Pat. No. 3,830,130 issued Aug. 20, 1974 to Harold E. Moore; and U.S. Pat. No. 3,913,440 issued Oct. 31, 1975 to Richard D. Baker.

SUMMARY OF THE INVENTION

Such prior art devices are relatively heavy and cumbersome to use and require a number of adjustments which must be made with great care whenever precision sawing is called for. In particular, most known saw guides are not well suited for the task of cutting sheet material such as large plywood panels which carpenters find difficult to perform with a reasonable degree of accuracy and speed. Most laminated panels are of a standard size, for example, a commonly used panel is 8 feet by 4 feet. When such a panel has to be sawn at a construction site, or in a basement workshop or the like, very often there is a shortage of space in which to lay out the work and mark off the proposed cuts prior to the actual sawing operation. The disadvantages inherent in known guides make them awkward or inconvenient to use in a confined space on a large, flexible sheet of plywood and, as a result, carpenters often resort to cutting without employing any sort of guide. Often such cuts are not accurate enough for a particular application of the plywood and much costly wood is wasted.

The present invention provides an extremely simple and effective solution to the problem of guiding a portable power saw, particularly when cutting sheet material. The apparatus includes an elongated guide bar adapted to be secured directly to the panel. One end of the guide bar can be attached to the panel by a clamp and the opposite end can be pivotally secured to the panel so as to position saw-guiding members on the bar a predetermined distance from a proposed cutting line. The saw is fitted with mating guide members which slidably engage one of the members on the guide bar as the saw is pushed across the panel to complete slightly more than one half of the cut, in the case where the panel is substantially twice as long as the guide bar. The guide bar is then repositioned on the panel to allow the remainder of the cut to be made, the mating guide member on the saw slidably engaging the other guide member on the bar as this is done. In this manner, an eight foot panel for example can be ripped lengthwise by making two successive cuts in the same direction.

BRIEF DESCRIPTION OF THE DRAWING

FIG. 1 is a plan view of a power saw guiding apparatus constructed in accordance with the present invention, the apparatus being shown in position of use on a large rectangular panel, FIG. 2 is a perspective view, part broken away, showing a guide bar of the apparatus, FIG. 3 is a perspective view of a preferred clamp used for attaching the guide bar to a workpiece, FIG. 4 is a perspective view, part broken away, showing a steady arm of the apparatus, FIG. 5 is a side elevational, part broken way and shown in section, of a power saw fitted with a slide connector of the present apparatus, and FIG. 6 is an enlarged vertical section taken on the line 6—6 of FIG. 5.

DESCRIPTION OF THE PREFERRED EMBODIMENTS

Referring to the drawings, the numeral 10 indicates generally the present saw guiding apparatus. FIG. 1 shows, by way of example, the apparatus 10 being used to cut a plywood panel 12 lengthwise. The standard panel 12 is 4 feet wide and 8 feet long and normally such a panel is cut by means of an electric power saw generally indicated at 14 in FIG. 1. Desirably the panel 12 is supported between work benches of the like, not shown, during the sawing operation.

The present apparatus comprises an elongated guide bar generally indicated at 20 which preferably is made of a length of aluminum channel. As shown in FIG. 1 and in detail in FIG. 2, the shape of the channel-like bar 20 provides a pair of guide rails 21 connected together by a generally flat web 22. The rails 21 are parallel between end edges 24 and 25 of the guide bar and provide the guide bar with vertical side edges 26 which are flat and parallel to the longitudinal axis 27 of the bar. The rails 21 have upped edges 28 which project the same distance above top surface 29 of the web. FIG. 2 also shows that opposing side edges 30 of the pair of guide rails 21 slope inwardly to a slight extend from the upper edges 28 to the top surface 29.

End edge 24 of the bar is provided with a longitudinal slot 34, see particularly FIG. 2. This narrow, rectangular slot is located on the axis 27 and extends into the web 22 only a short distance to terminate in an end wall 34a.

Another longitudinal slot 36 extends into the end edge 25 of the guide bar. This centrally disposed slot has an end wall 36a which, preferably, is normal to the longitudinal axis of the cross bar.

A short distance from the other end edge 25 of the guide bar, there is provided a cross bar 38 which is also shown best in detail in FIG. 2. This rectangular cross bar is secured to bottom surface 39 of the web of the guide bar by means of suitable fasteners 40. Side edge 41 of the cross bar is straight and is disposed at right angles to the longitudinal axis 27 of the bar. The bar 38 has a side edge 42 which is parallel to the edge 41. It will be noticed that the side edge 42 of the cross bar is spaced a considerable distance from the end edge 25 of the guide bar, thus providing the latter bar with a quite lengthly overhanging portion 43 in which the longitudinal slot 36 is formed. The cross bar has parallel end edges 44 and 45 each spaced the same predetermined distance from the longitudinal axis 27 of the guide bar. Thus, the bars 20 and 38 form a T-square which is extremely useful in a saw-guiding device when a cut is to be made perpendicular to a known straight edge.

The guide bar 20 is adapted to be secured to the panel 12 by means indicated generally by the numeral 50. Primarily, the securing means 50 comprises a slip clamp 52 which appears in FIG. 1 and is shown in detail in FIG. 3. This preferred type of clamp has a fixed jaw 53 and a serrated post 54. A movable jaw 56 is slidably mounted on the post and a nut 57 on this jaw supports a clamping bolt 58 opposite the fixed jaw 53.

The securing means generally indicated at 50 also includes a pivot nail 60 which, preferably, is simply a short finishing nail such as is illustrated best in FIG. 2.

This nail 60 intended to be driven into the panel through the slot 34 to augment the holding action of the clamp 52 as will be described later. The rectangular slot 34 has parallel side walls 34b spaced apart a distance only slightly greater than the diameter of the nail 60. In other words, there is little or no free play when the nail 60 is in the slot 34 and therefore the present guide bar is held firmly in the required position.

Additional support of the guide bar 20 can be provided at times by a steady arm 63 which is shown by dotted lines in FIG. 1 and in detail in FIG. 4. This portion of the securing means 50 comprises a board 64 which is fitted at one end with a metal claw 65. The claw 65 is provided with a transversely extending channel 66 which is cross-sectionally shaped to closely fit either one of the pair of guide rails 21.

Finally, the means 50 can also include a number of short finishing nails 68 (FIG. 2 only) which are adapted to be received in holes 69 formed in the guide bar 20. The nails 68 are only slightly smaller than the holes 69 so as to avoid free play and the holes are suitably spaced along the web 22 of the guide bar between the nail slot 34 and the cross bar 38.

The bar 20 is adapted to be placed on the panel 12 as shown in FIG. 1 to guide the power tool 14 which, in this instance, is a conventional saw intended to be pushed by hand over a board or other workpiece to execute a cutting stroke. As best shown in FIGS. 5 and 6, the saw 14 has a circular blade 74 which is driven by an electric motor 75. The saw is provided with a base plate 76 having a slot 77 (FIG. 6) to accommodate the blade. A handle 78 is fitted to the motor 75 so that the saw can be pushed along a workpiece with the base plate 76 in sliding contact with the top surface of the board or panel.

The apparatus 10 includes a device which enables the circular power saw 14 to be attached to the guide bar 20, and, for this purpose, the saw is fitted with a slide connector 85 as shown in FIGS. 5 and 6. This connector may be secured by screws 86 or other suitable fastening means to longitudinally spaced brackets 87 which project upwardly from the base plate 76 on the right side (i.e. FIGS. 1 and 6) of the saw. The connector 85 has integrally formed flanges 88 and 89, these laterally projecting flanges defining with the remainder of the connector an inverted U-shaped channel 90. The cross-sectional shape of this channel is such that a guide rail 21 can be lodged therein to form a fairly snug fit which allows the saw to be moved freely lengthwise of the guide bar without twisting about a vertical axis. It should be noticed that the flange 89 has an innermost face 91 which slopes to conform to the slope of the side edges 30 of the rails. Such an arrangement allows the slide connector 85 to be placed on and removed from a guide rail without difficulty. When the saw is moved along the panel during a cutting operation, there is no free play which will allow the saw blade to move away from the intended line of cut. The connector 85 can be left permanently attached to the base plate since it does not interfere with any normal operation of the saw.

In order to understand how the plywood panel 12 is cut lengthwise, reference should be made to FIGS. 1 and 3 wherein the apparatus 10 is shown in position of use. The plywood panel 12 is assumed to require cutting along a line which is, say, ten inches in from the left side (FIG. 1) of the panel and parallel thereto. The carpenter locates this proposed line of cut with tape measure or his ruler and then places a mark 100 on the top surface of the panel with the mark extending in only an inch or so from each opposite end edge of the panel.

The guide bar 20 is placed on the panel with the side edge 41 of the cross bar in contact with an end edge of the panel. The T-square guide bar is then moved laterally on the panel as might be found necessary to align the end or index edge 44 of the cross bar with the nearest mark 100 indicating the proposed line of cut.

One of the clamps 52 is then used to hold the cross bar end of the guide bar 20 in the selected position. As shown best in FIG. 3, this is done by threading the post 52 into the slot 36 until it abuts the end wall 36a of the slot and the side edge 42 of the cross bar. This places the fixed jaw 53 beneath the panel 12 as shown in FIG. 3 so that the clamping bolt 58 can be screwed down into engagement with the guide bar immediately ahead of the cross bar. As the bolt 58 is tightened, care is taken to keep the index edge 44 on the mark 100 and the bar 20 properly positioned on the panel.

Next the pivot nail 60 is placed against the end wall 34a of the slot and is driven part way into the panel. A careful carpenter may want to check the exact location of the unclamped end of the guide bar before actually driving in the nail 60. This is done by measuring in from the nearest side edge of the panel to locate the adjacent side edge 26 of the guide bar the required distance from the intended line of cut. With the unclamped end of the guide bar thus correctly position, the nail 60 can be applied as described.

The saw 14 is positioned so that the slide connector 85 can be fed into engagement with the end of the left rail 21 on the overhanging portion 43 of the guide bar. This places the blade 74 alongside the index edge 44 and directly in line with the nearest mark 100 indicating the proposed cut. It will be noticed the blade 74 is spaced some distance from the forward end of the base plate 74 and that the overhanging portion 43 of the guide bar extends over half the length of the base plate so that the saw is properly supported and the blade is correctly aligned with the mark. The saw is started and is pushed forwardly to commence cutting and thereby erase the nearest mark 100. As the connector 85 slides along the left guide rail 21 with the base plate 76 in sliding contact with the top surface of the panel, the saw is steadied and guided so that a straight cut is made exactly where intended. When the saw reaches the opposite end of the guide bar, the motor 75 is stopped and the saw can be removed from the panel or simply left sitting on the panel with the blade remaining in the kerf.

The length of the guide bar 20 is such as to allow a panel 8 feet long to be cut over slightly more than 4 feet of its length. Therefore, when the clamp 52 is removed, the guide bar can be swung about the pivot nail 60 to allow the cross bar 38 to be placed against the uncut end of the panel. As this is done, the pivot nail 60 will be found located a short distance (⅛th of an inch or so) from the end wall 34a of the slot due to the relative lengths of the guide bar and panel but the bar is still held steady by the nail which slidably fits between the closely confining sides 34b of the slot. The clamp 52 is reapplied in the previously described manner to grip the panel and the guide bar with care being taken to locate the index edge 45 of the cross bar in alignment with the remaining mark 100 at that end of the panel. Once the saw 14 is reattached to the guide bar, this time with the connector 85 slidably engaging the other guide rail 21 which is now on the carpenters left when he again takes up a suitable position alongside the sawn end of the panel, the cut can be restarted to extend the kerf left by the previously made saw cut. The blade 74 eventually passes through and erases the remaining mark 100. Thus, the present apparatus allows a plywood panel having a length substantially twice the length of the guide bar to be sawn through from end to end by two successive cuts made in the same direction and from the same end of the panel which will complete the sawing of a strip of the required width from the plywood panel.

A great many boards and the like which require cutting are four feet or less in length and the present apparatus allows such work to be sawn without leaving any nail holes. The workpiece is measured to allow accurate placement of the mark 100 whereupon the guide bar 20 is arranged on the board with the index edge 44 aligned with the mark. One of the clamps 52 is used to secure the cross bar end of the guide bar as before and a second such clamp is employed to secure the opposite end of the bar 20. The saw 14 is placed on the overhanging portion 43 of the guide bar and the cut is made with a single and continuous pass of the saw along the workpiece.

In some instances, the article to be sawn may not have an edge which can be gripped by a clamp so that other parts of the securing means 50 must be used. One side of a box, for example, which may be four foot square is sawn with the guide bar 20 secured to that side by means of the nails 68. Two nails 68 are driven through holes 68 located a maximum distance apart on the bar 29, this being done with the index edge 44 aligned with a suitably-placed mark 100. The saw 14 then has a steady guide as it is pushed across the article to execute a cutting stroke which leaves only two nail holes in the remaining surface.

The clamp 52 and pivot nail 60 will hold the apparatus 10 steady and allow accurate sawing to be done on an eight foot panel, for example as previously described, but the remainder of the panel is left with one nail hole when the apparatus is removed and the pivot nail 60 is withdrawn. At times, the carpenter may decide that the panel which remains after a strip has been sawn therefrom should not be marred by even the single hole left by the pivot nail 60, in which case, he will use the steady arm 63. First the claw 65 is placed over a rail 21 with the arm 63 in widely spaced relation to the clamp 52 as shown by dotted line in FIG. 1. The steady arm will then be disposed at right angles to the bar 20 and with the opposite end of the arm near a side edge of the panel. Another clamp 52 (shown by dotted lines in FIG. 1) is used to secure the steady arm to the edge of the panel. Thus, the guide bar 20 is secured by two clamps 52 and the steady arm 63 in such a manner that a cut can be made which leaves the panel free of nail holes or marks 100.

It will be appreciated that the index edges 44 and 45 on the cross bar are located a distance from the longitudinal axis of the guide bar according to the particular saw which is to be guided by the present apparatus. The saws of different manufacturers will vary somewhat with regard to the spacing of the circular blade relative to the edge of the base plate to which the slide connector 85 is secured. The present invention contemplates using a cross bar which initially is longer than the aforesaid spacing of all known electric hands saws. A customer will buy the saw guiding apparatus 10 with such an overly long cross bar and provide the necessary index edges which are correctly spaced for his particular saw. This is done by clamping the guide bar 20 to a piece of scrap lumber in a position to steady the saw. The saw is applied to the bar so as to be guided by each rail in turn and in a manner which will allow the blade to saw through the ends of the cross bar. Thus, the blade of that particular saw will henceforth be able to just clear the index edges of the cross bar when a cut is made in a workpiece and, in effect, the apparatus is matched to the saw.

From the foregoing, it will be apparent that lengthly and otherwise difficult cuts can be made in either one or two stages and with absolute precision. Boards and panels other than those of the standard size mentioned above can be cut with equal facility. The sawing can be done on formed articles such as furniture or on boards as well as sheet material of relatively small or non-standard sizes.

I claim:

1. Guiding apparatus for a power saw movable over a workpiece and comprising a guide bar having side and end edges, a saw-guiding member on the guide bar near each side edge, said saw-guiding members being parallel to the longitudinal axis of the guide bar and extending between the end edges, a cross bar near one end edge of the guide bar with said bars arranged to form a T-square, said cross bar having opposite end edges equidistantly spaced from adjacent saw-guiding members, securing means for releasably attaching the guide bar to the workpiece to extend over a surface thereof with the cross bar alongside one edge of said workpiece, a slide connector securable to the power saw for slidingly and matingly engaging a selected one of the saw-guiding members as the power saw is advanced along the surface of the workpiece during a cutting stroke, said guide bar having a longitudinal slot at one end edge, said longitudinal slot being located midway between the saw guiding members, and said securing means including a pivot member enterable through the longitudinal slot into the workpiece whereby the guide bar is swingable about said pivot member to locate the cross bar at an opposite edge of said workpiece.

2. Guiding apparatus as claimed in claim 1, in which said securing means comprises a plurality of longitudinally spaced holes formed in the guide bar, and at least two fasteners each enterable through a selected one of the holes into the workpiece.

3. Guiding apparatus as claimed in claim 1, in which said securing means includes a hand-operated clamp for clamping the guide bar to the workpiece.

4. Guiding apparatus as claimed in claim 1, in which said securing means includes a steady arm having a claw at one end thereof adapted to grip one of said saw-guiding members when said arm is resting on the workpiece normal to the guide bar, and a second hand-operated clamp for clamping the steady arm to the workpiece.

5. Guiding apparatus for a power saw movable over a workpiece and comprising a guide bar having side and end edges, a pair of guide rails on the guide bar one near each side edge, said pair of guide rails being parallel to the longitudinal axis of the guide bar and extending between the end edges, said guide bar having a longitudinal slot extending into one end edge, said longitudinal slot being located midway between the pair of guide rails, a cross bar secured to the underside of the guide bar spaced from the other of said end edges, said cross bar having opposite end edges equidistantly spaced from the longitudinal axis of the guide bar, securing means for releasably attaching the guide bar to the workpiece to overlie substantially one half of the workpiece with an opposite end edge of the cross bar indexing with a mark on said workpiece indicating a proposed saw cut, said securing means including a pivot member enterable through the longitudinal slot into the workpiece whereby the guide bar is swingable about said pivot member to overlie an opposite half of said workpiece, and a slide connector securable to the saw to slidably engage an adjacent rail of the pair of guide rails as the saw is advanced along the workpiece during a cutting stroke.

6. Guiding apparatus as claimed in claim 5, in which said guide bar has a second longitudinal slot extending into an end edge thereof opposite the first-mentioned longitudinal slot, and said securing means including a hand-operated clamp enterable into the second longitudinal slot to secure the guide bar to the workpiece.

* * * * *